(12) United States Patent
Yao et al.

(10) Patent No.: US 10,402,030 B2
(45) Date of Patent: Sep. 3, 2019

(54) DISPLAY PANEL AND TOUCH DISPLAY DEVICE

(71) Applicant: SHANGHAI TIANMA MICRO-ELECTRONICS CO., LTD., Shanghai (CN)

(72) Inventors: Qijun Yao, Shanghai (CN); Shaolong Ma, Shanghai (CN); Feng Lu, Shanghai (CN); Liang Liu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/811,679

(22) Filed: Nov. 14, 2017

(65) Prior Publication Data

US 2018/0067587 A1 Mar. 8, 2018

(30) Foreign Application Priority Data

Jun. 30, 2017 (CN) .......................... 2017 1 0522399

(51) Int. Cl.
| | |
|---|---|
| *G06F 3/041* | (2006.01) |
| *G06F 3/045* | (2006.01) |
| *G02F 1/1333* | (2006.01) |
| *G06F 3/044* | (2006.01) |
| *G06F 1/3234* | (2019.01) |

(52) U.S. Cl.
CPC .......... *G06F 3/044* (2013.01); *G02F 1/13338* (2013.01); *G06F 1/3262* (2013.01); *G06F 3/045* (2013.01); *G06F 3/0416* (2013.01); *G06F 2203/04103* (2013.01); *G06F 2203/04105* (2013.01)

(58) Field of Classification Search
CPC ........ G06F 3/044; G06F 3/0416; G06F 3/045; G06F 1/3262; G06F 2203/04105; G06F 2203/04103; G02F 1/13338
See application file for complete search history.

(56) References Cited

U.S. PATENT DOCUMENTS

2012/0268144 A1* 10/2012 Ahn ...................... G06F 3/044
 324/679
2013/0047747 A1* 2/2013 Joung .................... G01L 1/142
 73/862.68

(Continued)

*Primary Examiner* — Brent D Castiaux

(74) *Attorney, Agent, or Firm* — Kilpatrick Townsend & Stockton LLP

(57) ABSTRACT

Disclosed are a display panel and a touch display device. The display panel comprises a pressure sensor, the pressure sensor comprises a first resistor, a second resistor, a third resistor, a fourth resistor, a first set of connection blocks and a second set of connection blocks; the material of the first resistor, the second resistor, the third resistor and the fourth resistor is a semiconductor material; the material of the first set of connection blocks and the second set of connection blocks is a metal material; the display panel further comprises a first direction and a second direction; the first resistor and the third resistor comprise at least two subresistors; each subresistor forming the same resistor is connected end to end with each other via the second set of connection blocks; the shape of each subresistor, the second resistor and the fourth resistor is a bar.

12 Claims, 17 Drawing Sheets

(56) References Cited

U.S. PATENT DOCUMENTS

| | | | |
|---|---|---|---|
| 2014/0022177 A1* | 1/2014 | Shaw | G06F 1/1669 345/168 |
| 2015/0128713 A1* | 5/2015 | Kakoiyama | G01L 9/0052 73/721 |
| 2015/0378486 A1* | 12/2015 | Yu | G06F 3/0412 345/174 |
| 2016/0293081 A1* | 10/2016 | Kitsomboonloha | G06F 3/0416 |

* cited by examiner

DISPLAY PANEL AND TOUCH DISPLAY DEVICE

CROSS-REFERENCE TO RELATED APPLICATIONS

This application claims priority to Chinese Patent Application No. 201710522399.3, filed on Jun. 30, 2017 and entitled "DISPLAY PANEL AND TOUCH DISPLAY DEVICE", the disclosure of which is incorporated herein by reference in its entirety.

TECHNICAL FIELD

The present disclosure relates to touch pressure detection technologies, and in particular, to a display panel and a touch display device.

BACKGROUND

At present, display panels integrated with a touch electrode are widely applied to electronic apparatuses such as mobile phones, tablet computers and information inquiry machines in public halls, etc. As such, a user can operate on an electronic apparatus by only touching an icon on the electronic apparatus, and hence there is no need for the user on other input apparatuses (for example, a keyboard and a mouse, etc.) and human-machine interaction is made simpler and easier.

For better meeting user requirements, a pressure sensor for detecting the magnitude of the touch pressure by which a user touches a display panel is usually provided in a display panel to improve the application functionality of the touch technology. However, in the existing display panels, even if a touch location (i.e., a pressed location) is very close to the pressure sensor, the pressure-sensitive detection signal output by the pressure sensor after being pressed is still very small. If the pressure-sensitive detection signal output by the pressure sensor is too small, it will be covered by the noise signals, and hence no touch pressure value can be obtained based on such the pressure-sensitive detection signal, so that the pressure-sensitive detection performance of the display panel will be poor.

SUMMARY

The present disclosure provides a display panel and a touch display device to improve the pressure-sensitive detection performance of the display panel In a first aspect, embodiments of the application provide a display panel, which comprises: a substrate; and at least one pressure sensor provided on the substrate, which includes a first resistor, a second resistor, a third resistor, a fourth resistor, a first set of connection blocks and a second set of connection blocks; the first resistor, the second resistor, the third resistor and the fourth resistor are made of semiconductor material, and the first set of connection blocks and the second set of connection blocks are made of metal material; the display panel further includes a first direction and a second direction intersecting the first direction, the first resistor and the third resistor each include at least two subresistors, and each of the subresistors forming the same resistor is connected end to end with each other via the second set of connection blocks; each of the subresistors, the second resistor and the fourth resistor has a bar shape, each of the subresistors extends along the first direction, and the second resistor and the fourth resistor extend along the second direction; the first set of connection blocks includes a first connection block, a second connection block, a third connection block and a fourth connection block, the first end of the first resistor and the first end of the fourth resistor are electrically connected with the first connection block, the second end of the first resistor and the first end of the second resistor are electrically connected with the second connection block, the second end of the fourth resistor and the first end of the third resistor are electrically connected with the third connection block, and the second end of the second resistor and the second end of the third resistor are electrically connected with the fourth connection block; and a first power signal input terminal is provided on the first connection block, a second power signal input terminal is provided on the fourth connection block, to input a bias voltage signal to the pressure sensor; and a first sensing signal output terminal is provided on the second connection block, and a second sensing signal output terminal is provided on the third connection block, to output a pressure-sensitive detection signal from the pressure sensor.

In a second aspect, embodiments of the disclosure further provide a touch display device, which includes any display panel according to the embodiments of the disclosure.

In the embodiments of the disclosure, a first set of connection blocks and a second set of connection blocks of a metal material are additionally provided, and each of the subresistors forming the same resistor is connected end to end with each other via the second set of connection blocks, each subresistor extends along the first direction, and the second resistor and the fourth resistor extend along the second direction, so that the first resistor and the third resistor formed by the subresistors can only sense the strain in the first direction, rather than the strain in other directions; also, the second resistor and the fourth resistor can only sense the strain in the second direction, rather than the strains in other directions, and the signal cancellation on the resistors forming the pressure sensor due to the simultaneous sensing of the strains in two or more directions may be avoided, so that the pressure-sensitive detection signal output by the pressure sensor may be enlarged, and the problem of the existing display panel that the pressure-sensitive detection performance is poor due to the too small pressure-sensitive detection signal may be solved, thereby improving the pressure-sensitive detection performance of the display panel.

DETAILED DESCRIPTION

The disclosure will be illustrated in detail in conjunction with the drawings and embodiments. It may be understood that, the embodiments described here are only set for explaining, rather than limiting, the application. Additionally, it further needs to be noted that, for convenient description, the drawings only show the parts related to the application, rather than the whole structure.

Figure 1:
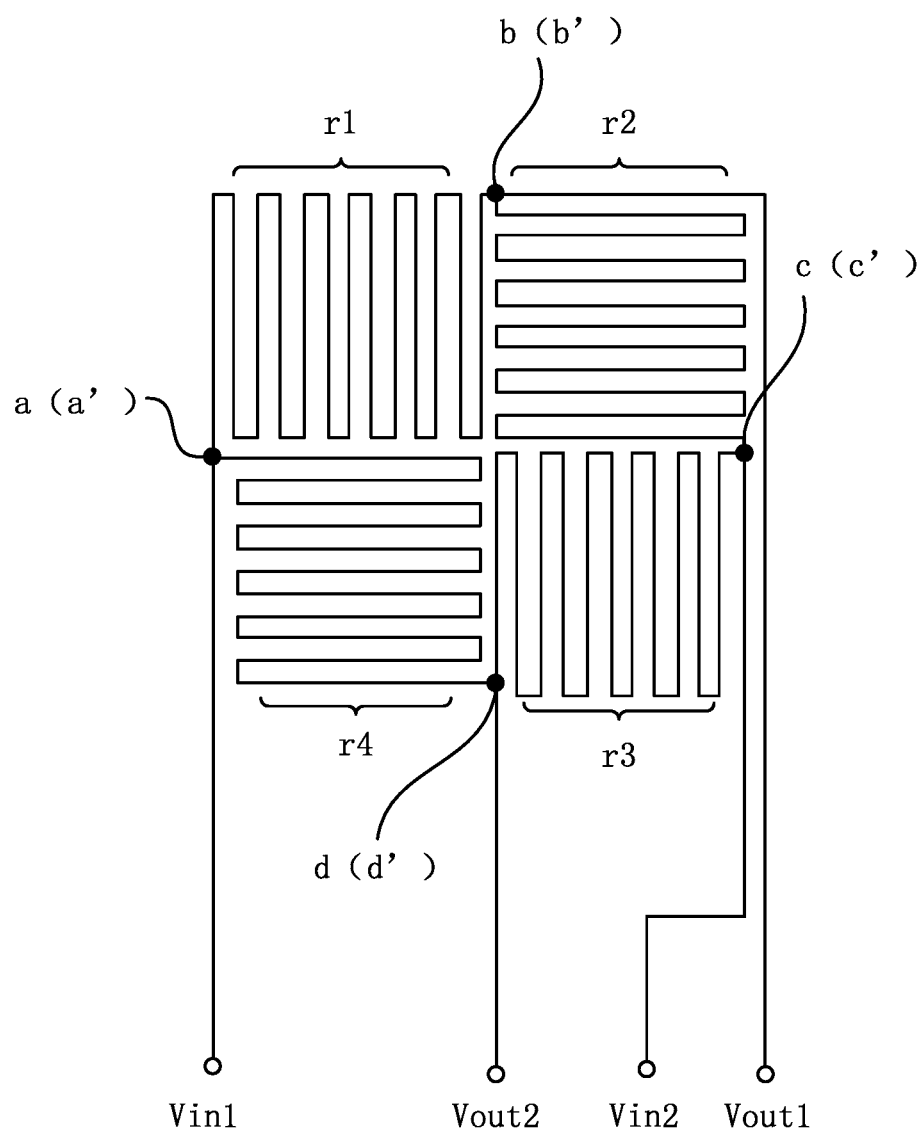
FIG. 1 is a structural representation of an existing pressure sensor.

FIG. 1 is a structural representation of an existing pressure sensor. Referring to FIG. 1, the pressure sensor includes a first inductive resistor r1, a second inductive resistor r2, a third inductive resistor r3 and a fourth inductive resistor r4; the first end a of the first inductive resistor r1 and the first end a' of the fourth inductive resistor r4 are electrically connected with a first power signal input terminal Vin1, the second end of b of the first inductive resistor r1 and the first end b' of the second inductive resistor r2 are electrically connected with a first induction signal measuring terminal Vout1, the second end d of the fourth inductive resistor r4 and the first end d' of the third inductive resistor r3 are electrically connected with a second induction signal measuring terminal Vout2, and the second end c of the second inductive resistor r2 and the second end c' of the third inductive resistor r3 are electrically connected with a second power signal input terminal Vin2; the first power signal input terminal Vin1 and the second power signal input terminal Vin2 are configured to input a bias voltage signal to the pressure sensor; the first induction signal measuring terminal Vout1 and the second induction signal measuring terminal Vout2 are configured to output a pressure-sensitive detection signal from the pressure sensor.

Figure 2:
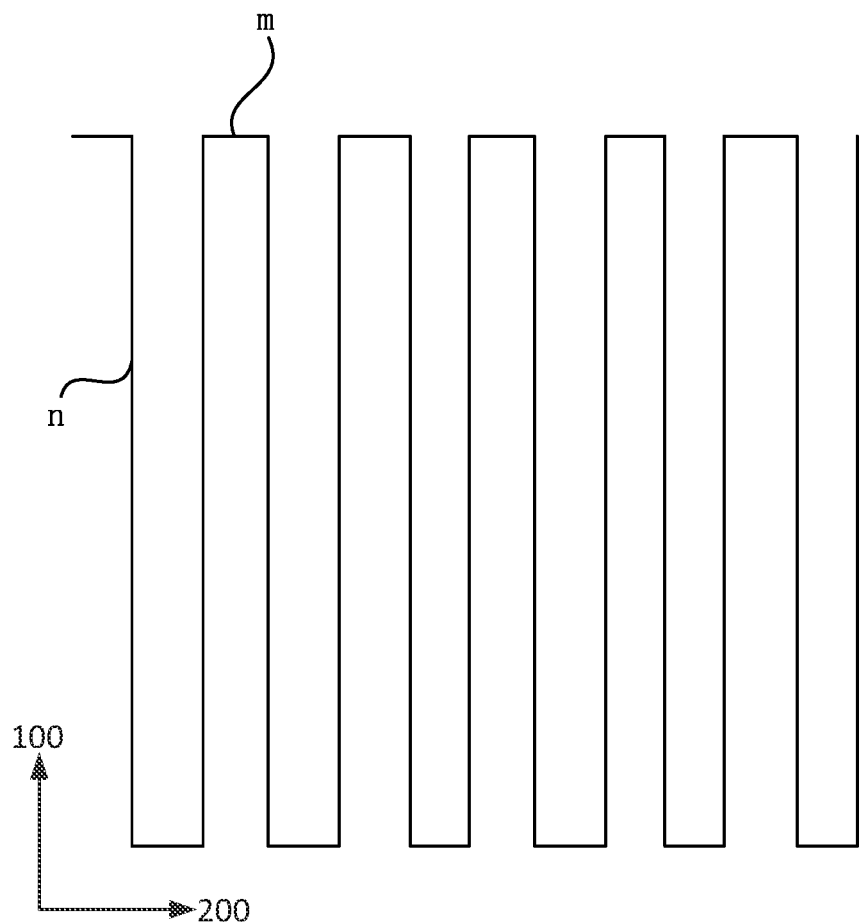
FIG. 2 is an enlarged view of a first inductive resistor r1 in FIG. 1.

For any one of the first inductive resistor r1, the second inductive resistor r2, the third inductive resistor r3 and the fourth inductive resistor r4, it is affected by the strains in two directions, so that the pressure-sensitive detection signal actually output by the pressure sensor is very small. Specifically, detailed illustration will be given taking the first inductive resistor r1 as an example. FIG. 2 is an enlarged view of a first inductive resistor r1 in FIG. 1. Referring to FIG. 2, the first inductive resistor r1 is bent in the form of serpentine, and includes a first portion n with an extension direction parallel to a first direction 100 and a second portion m with an extension direction parallel to a second direction 200, wherein the first portion n and the second portion m are arranged separately and connected end to end. Because the extension direction of the first portion n is parallel to the first direction 100, it may sense the strain in the first direction 100, and because the extension direction of the second portion m is parallel to the second direction 200, it may sense the strain in the second direction 200. However, for the whole first inductive resistor r1, because it includes the first portion n and the second portion m, it may be affected by the strain in the first direction 100 and the strain in the second direction 200 simultaneously, so that signal cancellation may occur, which finally leads to the very small pressure-sensitive detection signal output from the pressure sensor. If the pressure-sensitive detection signal output by the pressure sensor is too small, it may be covered by the noise signals, and hence no touch pressure value can be obtained based on such the pressure-sensitive detection signal, so that the pressure-sensitive detection performance of the display panel may be very poor.

In view of this, an embodiment of the application provides a display panel to improve the pressure-sensitive detection performance of the display panel.

Figure 3:
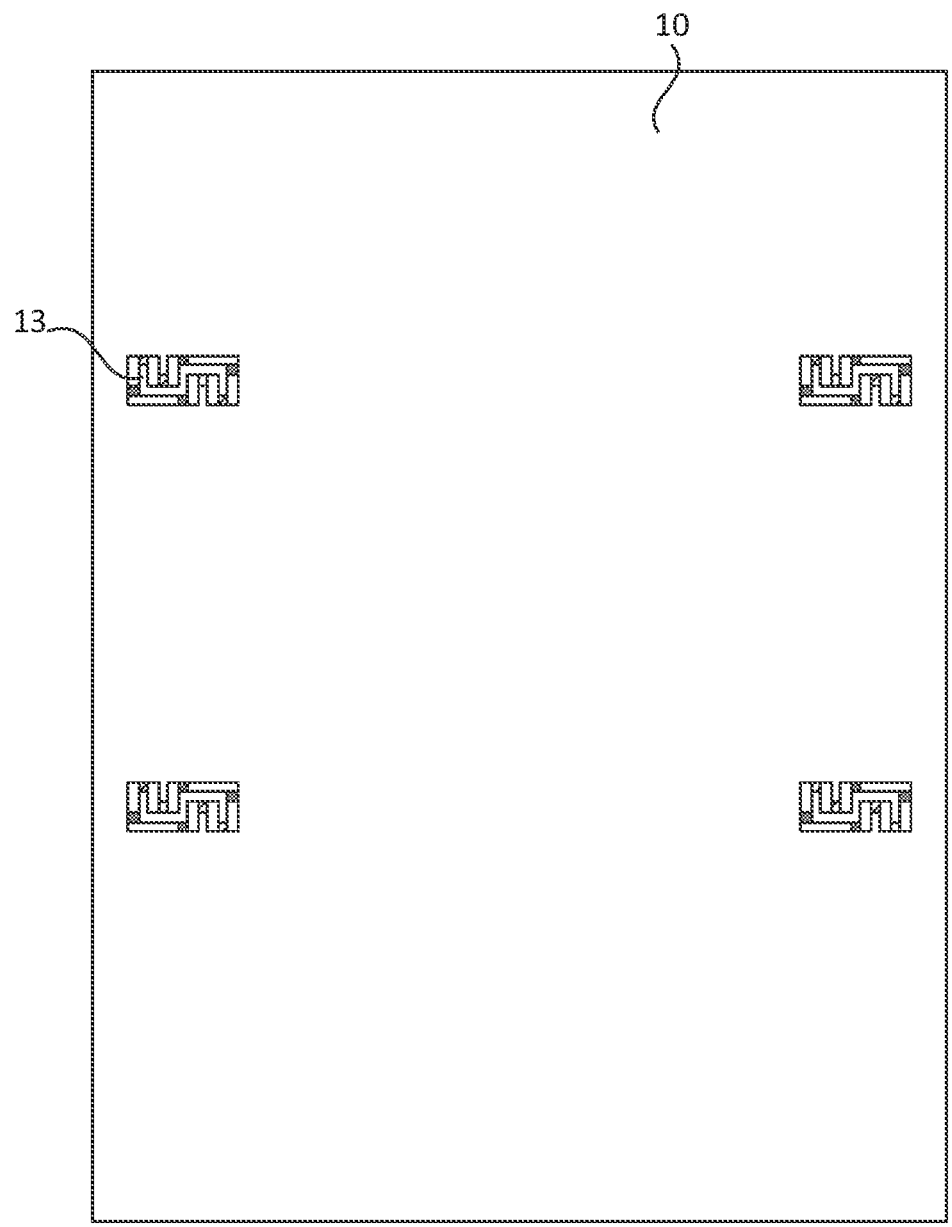
FIG. 3 is a structural representation of a display panel according to an embodiment of the disclosure.
Figure 4:
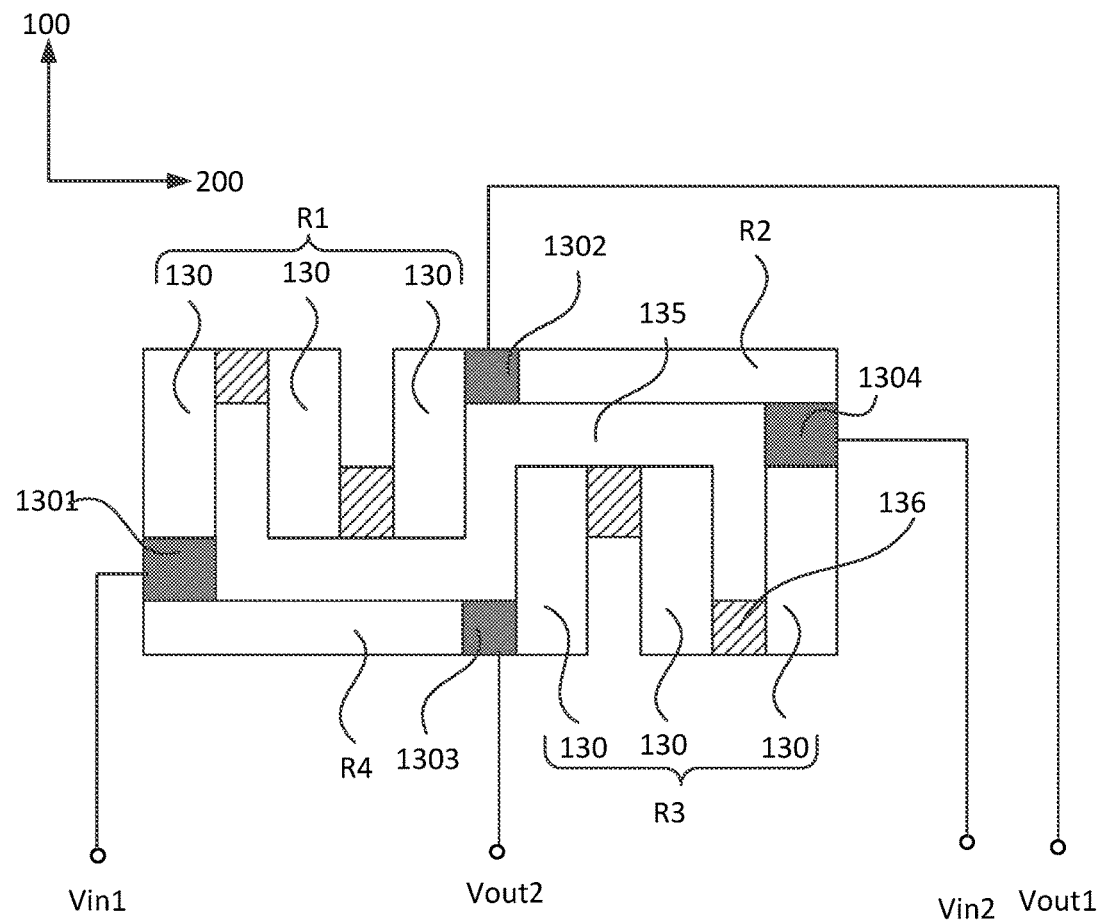
FIG. 4 is an enlarged view of the pressure sensor in FIG. 3.

FIG. 3 is a structural representation of a display panel according to an embodiment of the disclosure, and FIG. 4 is an enlarged view of the pressure sensor in FIG. 3. Referring to FIG. 3 and FIG. 4, the display panel includes: a substrate 10; and at least one pressure sensor 13 provided on the substrate 10. The pressure sensor 13 includes a first resistor R1, a second resistor R2, a third resistor R3, a fourth resistor R4, a first set of connection blocks and a second set of connection blocks 136; the material of the first resistor R1, the second resistor R2, the third resistor R3 and the fourth resistor R4 is a semiconductor material; the material of the first set of connection blocks and the second set of connection blocks 136 is a metal material; the display panel further includes a first direction 100 and a second direction 200 intersecting the first direction 100; the first resistor R1 and the third resistor R3 each include at least two subresistors 130; the subresistors forming the same resistor 130 are connected end to end with each other via the second set of connection blocks 136; the subresistors 130, the second resistor R2 and the fourth resistor R4 have a bar shape, the subresistors 130 extend along the first direction 100, and the second resistor R2 and the fourth resistor R4 extend along the second direction 200; the first set of connection blocks includes a first connection block 1301, a second connection block 1302, a third connection block 1303 and a fourth connection block 1304; the first end of the first resistor R1 and the first end of the fourth resistor R4 are electrically connected with the first connection block 1301, the second end of the first resistor R1 and the first end of the second resistor R2 are electrically connected with the second connection block 1302, the second end of the fourth resistor R4 and the first end of the third resistor R3 are electrically connected with the third connection block 1303, and the second end of the second resistor R2 and the second end of the third resistor R3 are electrically connected with the fourth connection block 1304; the first power signal input terminal Vin1 is provided on the first connection block 1301, the second power signal input terminal Vin2 is provided on the fourth connection block 1304, to input a bias voltage signal to the pressure sensor 13; the first sensing signal output terminal Vout1 is provided on the second connection block 1302, the second sensing signal output terminal Vout2 is provided on the third connection block 1303, to output a pressure-sensitive detection signal from the pressure sensor 13.

In the above technical solutions, the subresistor 130, the second resistor R2 and the fourth resistor R4 have a bar shape, and the extension direction thereof refers to the direction of their respective long edge. The subresistor 130, the second resistor R2 and the fourth resistor R4 are configured to sense the strains in extension directions thereof, respectively.

Still referring to FIG. 4, because the strain sensitivity coefficient of a metal material has an order of magnitude less than that of the semiconductor material, and the second set of connection blocks 136 only has the function of electrical connection, the size thereof may not be provided too large in practical arrangement, so that even if the second set of connection blocks 136 made of a metal material may sense the strain in the second direction 200, the strain in the second direction 200 sensed by the second set of connection blocks may be much less than the strain in the first direction 100 sensed by the subresistor 130 made of a semiconductor material, and hence it may be ignored. That is, when being pressed, the subresistor 130 may only sense the strain in the first direction 100. For the whole pressure sensing, the first resistor R1 and the third resistor R3 formed by the subresistors 130 can only sense the strain in the first direction 100, rather than the strains in other directions. Also, the second resistor R2 and the fourth resistor R4 can only sense the strain in the second direction 200, rather than the strains in other directions, so that the signal cancellation on the resistors forming the pressure sensor 13 due to the simultaneous sensing of the strains in two or more directions may be avoid, the pressure-sensitive detection signal output by the pressure sensor 13 may be increased, and hence it solves the problem of the existing display panel that the signal cancellation may occur because the electrodes of the pressure sensor may be affected by the strains in the first direction 100 and the strain in the second direction 200 simultaneously so that the pressure-sensitive detection signal output from the pressure sensor finally may be very small and the pressure-sensitive detection performance is poor, thereby improving the pressure-sensitive detection performance of the display panel.

Figure 5:
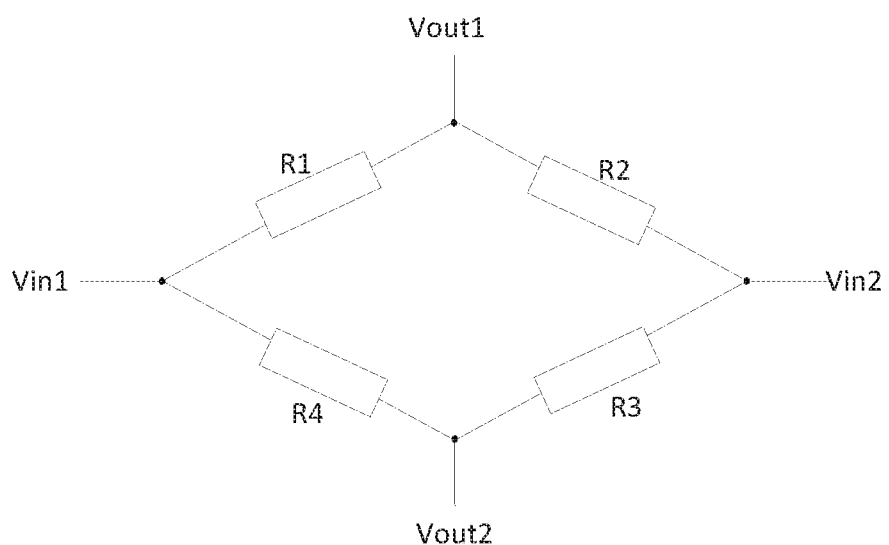
FIG. 5 is an equivalent circuit diagram of the pressure sensor in FIG. 4.

FIG. 5 is an equivalent circuit diagram of the pressure sensor in FIG. 4. Referring to FIG. 4 and FIG. 5, the first resistor R1, the second resistor R2, the third resistor R3 and the fourth resistor R4 form a Wheatstone bridge structure. When a bias voltage signal is input into the first power signal input terminal Vin1 and the second power signal input terminal Vin2, an electric current may pass through each of the branches in the Wheatstone bridge. At this time, when the display panel is pressed, under the action of a shear force on the display panel at the location corresponding to the pressure sensor 13, the impedance of each of the resistors inside the pressure sensor 13 (including the first resistor R1, the second resistor R2, the third resistor R3 and the fourth resistor R4) may change, so that the pressure-sensitive detection signals output from the first induction signal measuring terminal Vout1 and the second induction signal measuring terminal Vout2 of the pressure sensor 13 may be different from the pressure-sensitive detection signals output from the first induction signal measuring terminal Vout1 and the second induction signal measuring terminal Vout2 of the pressure sensor 13 without being pressed, and hence the magnitude of the touch pressure may be determined.

It is found that, during pressing the display panel, the strain difference between two directions vertical to each other is the maximum. Therefore, referring to FIG. 4, it is possible that the first direction 100 is vertical to the second direction 200. The advantage of such a configuration lies in that, the variation between pressure-sensitive detection signals output by the pressure sensor 13 before and after being pressed may be increased, thereby improving the sensitivity of pressure detection.

During touch pressure detection, the variation between pressure-sensitive detection signals may be obtained by comparing the pressure-sensitive detection signal output by the pressure sensor 13 after a touch pressure is applied, with the pressure-sensitive detection signal output by the pressure sensor 13 before the touch pressure is applied, thereby obtaining the magnitude of the touch pressure based on the variation between pressure-sensitive detection signals. Based on this, the ratio of the resistance value of the first resistor R1 to the resistance value of the second resistor R2 is configured to be equal to the ratio of the resistance value of the fourth resistor R4 to the resistance value of the third resistor R3. The advantage of such a configuration lies in that, in the case that a bias voltage signal is applied to the pressure sensor 13 and the resistance values of the first resistor R1, the second resistor R2, the third resistor R3 and the fourth resistor R4 meet the above relations, the component voltage on the first resistor R1 is the same as the component voltage on the fourth resistor R4, and the component voltage on the second resistor R2 is the same as the component voltage on the third resistor R3. When not pressed, the potentials on the first induction signal measuring terminal Vout1 and the second induction signal measuring terminal Vout2 of the pressure sensor equal to each other, and pressure-sensitive detection signals output by the first induction signal measuring terminal Vout1 and the second induction signal measuring terminal Vout2 are both zero. When being pressed, the pressure-sensitive detection signal output by the pressure sensor 13 is equal to the variation between the pressure-sensitive detection signals output by the pressure sensor 13 before and after being pressed. Thus, it is favorable for simplifying the calculation process of the touch pressure value and shortening the response time of the display panel to perform, according to the magnitude of the touch pressure, the corresponding operation.

Typically, the resistance values of the first resistor R1, the second resistor R2, the third resistor R3 and the fourth resistor R4 are equal to each other. Thus, in the case of not being pressed, the potentials on the first induction signal measuring terminal Vout1 and the second induction signal measuring terminal Vout2 are equal to each other, and the pressure-sensitive detection signals output by the first induction signal measuring terminal Vout1 and the second induction signal measuring terminal Vout2 are both zero, which is favorable for simplifying the calculation process of the pressure and shortening the response time of the display panel to perform, according to the magnitude of the touch pressure, the corresponding operation.

During practical manufacturing, there are various methods for configuring the resistance values of the first resistor R1, the second resistor R2, the third resistor R3 and the fourth resistor R4 in order to meet that the ratio of the resistance value of the first resistor R1 to the resistance value of the second resistor R2 is equal to the ratio of the resistance value of the fourth resistor R4 to the resistance value of the third resistor R3. A formula is given by $$R = \rho \frac{l}{S},$$

wherein, R is the resistance value of the resistor, $\rho$ is the resistivity of the material forming the resistor, l is the length of the resistor along the current flow direction, and S is the cross section of the resistor vertical to the current flow direction. It may be known that, under the condition that ρ and S are given, the magnitude of the resistance value R of the resistor depends on the length l thereof along the current flow direction. Therefore, the subresistor 130 of the first resistor R1, the subresistor 130 of the third resistor R3, and the second resistor R2 and the fourth resistor R4 are all rectangles. The cross-sectional area of each of the subresistors 130 vertical to the first direction 100, the cross-sectional area of the second resistor R2 vertical to the second direction 200 and the cross-sectional area of the fourth resistor R4 vertical to the second direction 200 are equal to each other. Thus, in the case that the each of the subresistors 130, the second resistor R2 and the fourth resistor R4 are made of same materials, the ratio of the resistance value of the first resistor R1 to the resistance value of the second resistor R2 can be made equal to the ratio of the resistance value of the fourth resistor R4 to the resistance value of the third resistor R3 by only adjusting the length of the subresistor 130, the second resistor R2 and the fourth resistor R4, so that the difficulty of the manufacture process of the display panel may be lowered, and the production cycle of the display panel may be shortened.

Figure 6:
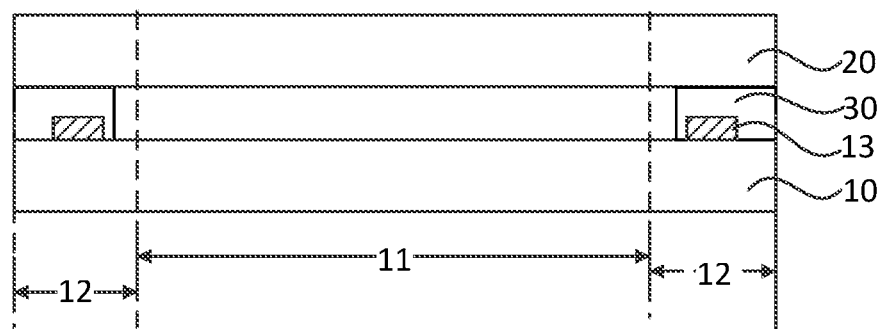
FIG. 6 is a structural representation of another display panel according to an embodiment of the disclosure.

FIG. 6 is a structural representation of another display panel according to an embodiment of the disclosure. Referring to FIG. 6, in addition to the substrate 10, the display panel further includes an opposite substrate 20 that is opposite to the substrate 10. The display panel may be a liquid crystal display panel or an organic light-emitting display panel. If the display panel is a liquid crystal display panel, the substrate 10 may be provides as an array substrate, and the opposed substrate 20 may be provides as a color filter substrate; or, the substrate 10 may be provided as a color filter substrate, and the opposed substrate 20 may be provided as an array substrate. If the display panel is an organic light-emitting diode (OLED) display panel, the substrate 10 may be provides as an array substrate, and the opposed substrate 20 may be provides as a cover plate, or the substrate 10 may be provided as a cover plate, and the opposed substrate 20 may be provided as an array substrate. In other words, if the display panel is a liquid crystal display panel, the pressure sensor 13 may be provided on an array substrate, or it may be provided on a color filter substrate. If the display panel is an OLED display panel, the pressure sensor 13 may be provided on an array substrate, or it may be provided on a cover plate.

Further, in consideration that a circuit structure for driving a liquid crystal to rotate (corresponding to a liquid crystal display panel) or driving a light-emitting layer to emit light (corresponding to an OLED display panel) may generally be provided on the array substrate, the pressure sensor 13 may optionally be provided on the array substrate. The advantage of such a configuration lies in that, the pressure sensor 13 and a signal line connected with the pressure sensor 13 may be formed while forming a circuit structure for driving a liquid crystal to rotate or driving a light-emitting layer to emit light, and hence the manufacture process may be simplified. Additionally, a part of the signal lines in the circuit structure for driving a liquid crystal to rotate or driving a light-emitting layer to emit light may be further multiplexed as the signal line electrically connected with the pressure sensor 13 to transfer a bias voltage signal to the pressure sensor 13 or transfer a pressure-sensitive induction detection signal output from the pressure sensor 13, thereby reducing the arrangement region of the signal line connected with the pressure sensor 13.

Figure 7:
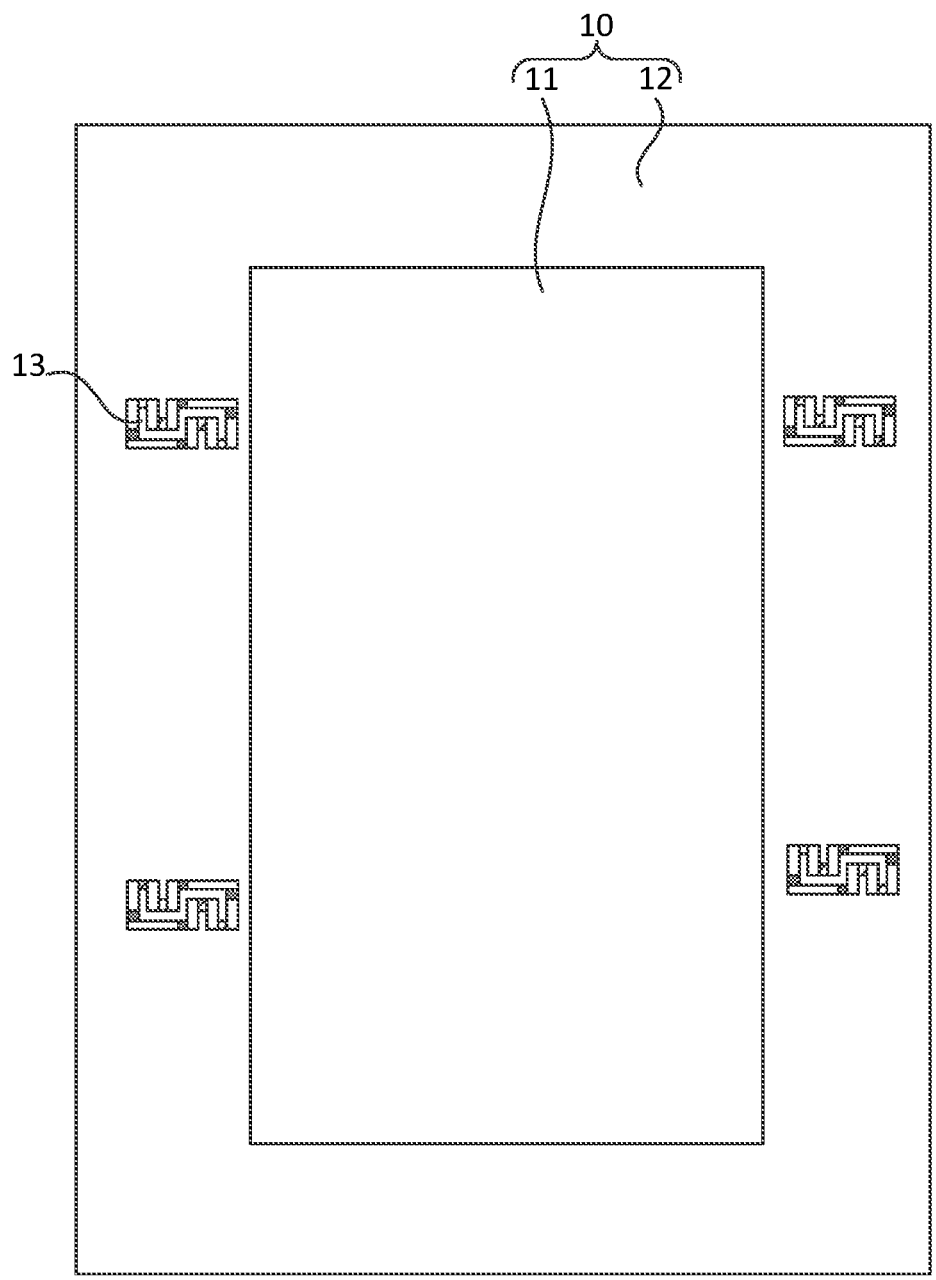
FIG. 7 is a structural representation of yet another display panel according to an embodiment of the disclosure.

FIG. 7 is a top view showing the structure of another display panel according to an embodiment of the disclosure. Referring to FIG. 7, the display panel includes a display region 11 and a non-display region 12 surrounding the display region 11. The pressure sensor 13 may be located in the non-display region 12 or in the display region 11.

In FIG. 7, the pressure sensor 13 is exemplarily located in the non-display region 12. In conjunction with FIG. 6 and FIG. 7, in practice, the display panel further includes a sealant 30, which is provided between the substrate 10 and the opposed substrate 20 to adhere the substrate 10 to the opposed substrate 20, and the projection of the sealant on the substrate 10 is located in the non-display region 12. During the curing of the sealant 30, ultraviolet light (UV) is often employed to irradiate the sealant 30 from one side of the substrate 10 to make a hardening reaction on the sealant 30. In conjunction with FIG. 4 and FIG. 6, if the vertical projection of the sealant 30 on the substrate 10 at least partially overlaps the pressure sensor 13, the blocking of the ultraviolet light by the pressure sensor 13 may be reduced because a hollow region 135 is surrounded and hence formed by the first resistor R1, the second resistor R2, the third resistor R3 and the fourth resistor R4 in the pressure sensor 13, so that the transmittance of the ultraviolet light may be improved, which helps for fully curing the sealant and avoiding bad phenomena (for example, leakage of the liquid crystal, etc.) caused by insufficient curing of the sealant.

If the pressure sensor 13 is located in the display region, the pressure sensor 13 may optionally be provided in an opening area or a non-opening area of the display panel. If the pressure sensor 13 is provided in an opening area of the display panel, because the pressure sensor includes a hollow region 135 surrounded and hence formed by the first resistor R1, the second resistor R2, the third resistor R3 and the fourth resistor R4, it is favorable for passing the light generated by the display panel for image display, lowering the affection of the pressure sensor 13 on the display effect of the display panel and improving penetration rate of the display panel. For a liquid crystal display panel, if the pressure sensor 13 is provided in the opening area of the display panel, the pressure sensor 13 may optionally also be provided in a domain line region of a pixel unit of the display panel. Because in the domain line region of a liquid crystal display panel, the orientation of the liquid crystal molecules is disorder, the brightness thereof is lower than that of other regions, so that the affection of the pressure sensor 13 on the display effect of the liquid crystal display panel may be similarly lowered by providing the pressure sensor 13 in the domain line region. If the pressure sensor 13 is located in the non-opening area, the pressure sensor 13 may optionally also be provided in a black matrix light shielding area. By such a configuration, the effect of the pressure sensor 13 on the display effect of the display panel may be lowered effectively.

Figure 8:
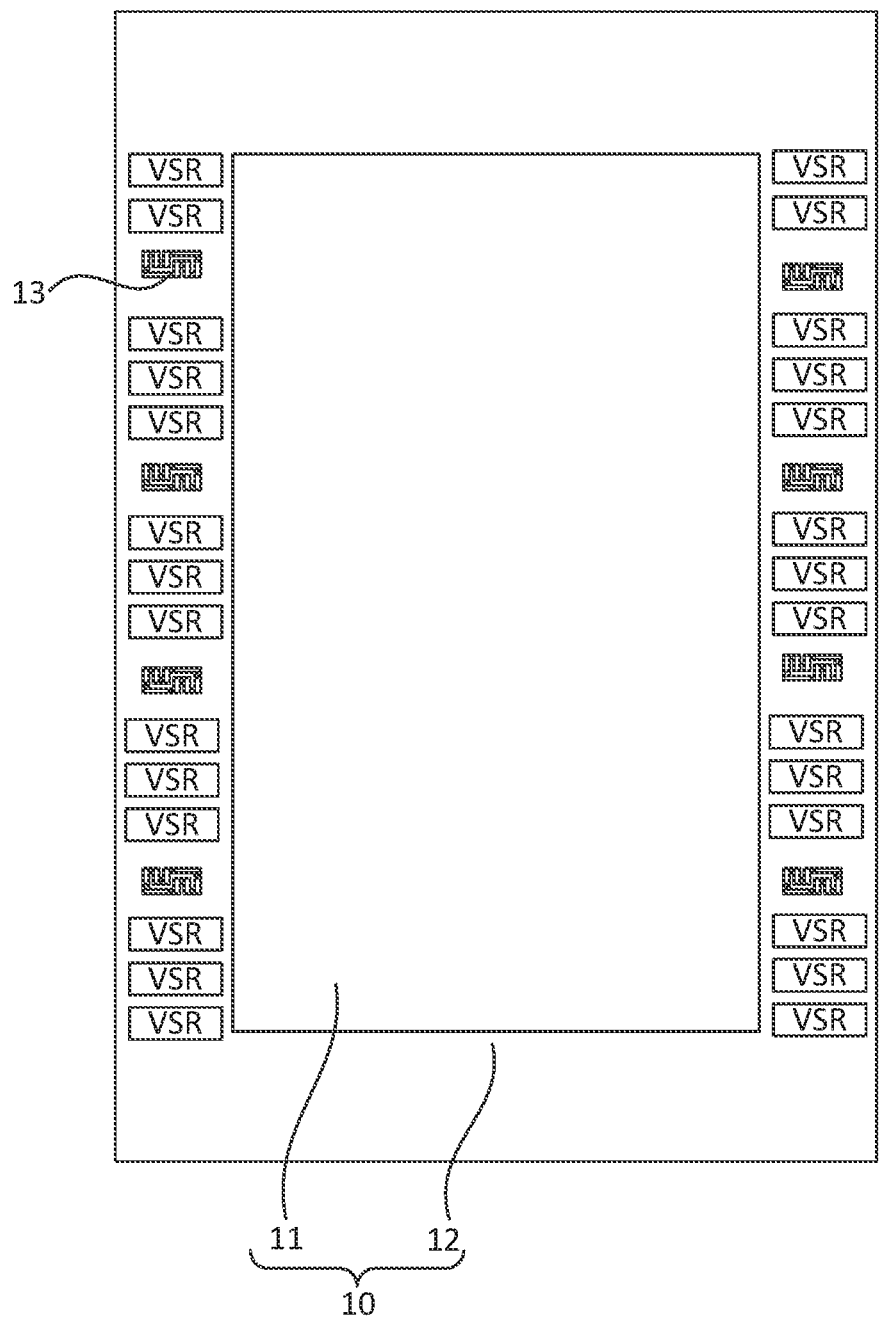
FIG. 8 is a structural representation of yet another display panel according to an embodiment of the disclosure.

Referring to FIG. 8, the non-display region 12 of the display panel further includes a plurality of cascaded shift registers VSR. In one embodiment, the pressure sensor 13 is located between adjacent two shift registers VSR the profile shape of the pressure sensor 13 is a rectangle. The profile shape of the pressure sensor 13 may be the pattern surrounded by the edges of the pressure sensor 13 (i.e., the bold dashed line in FIG. 9).

Figure 10:
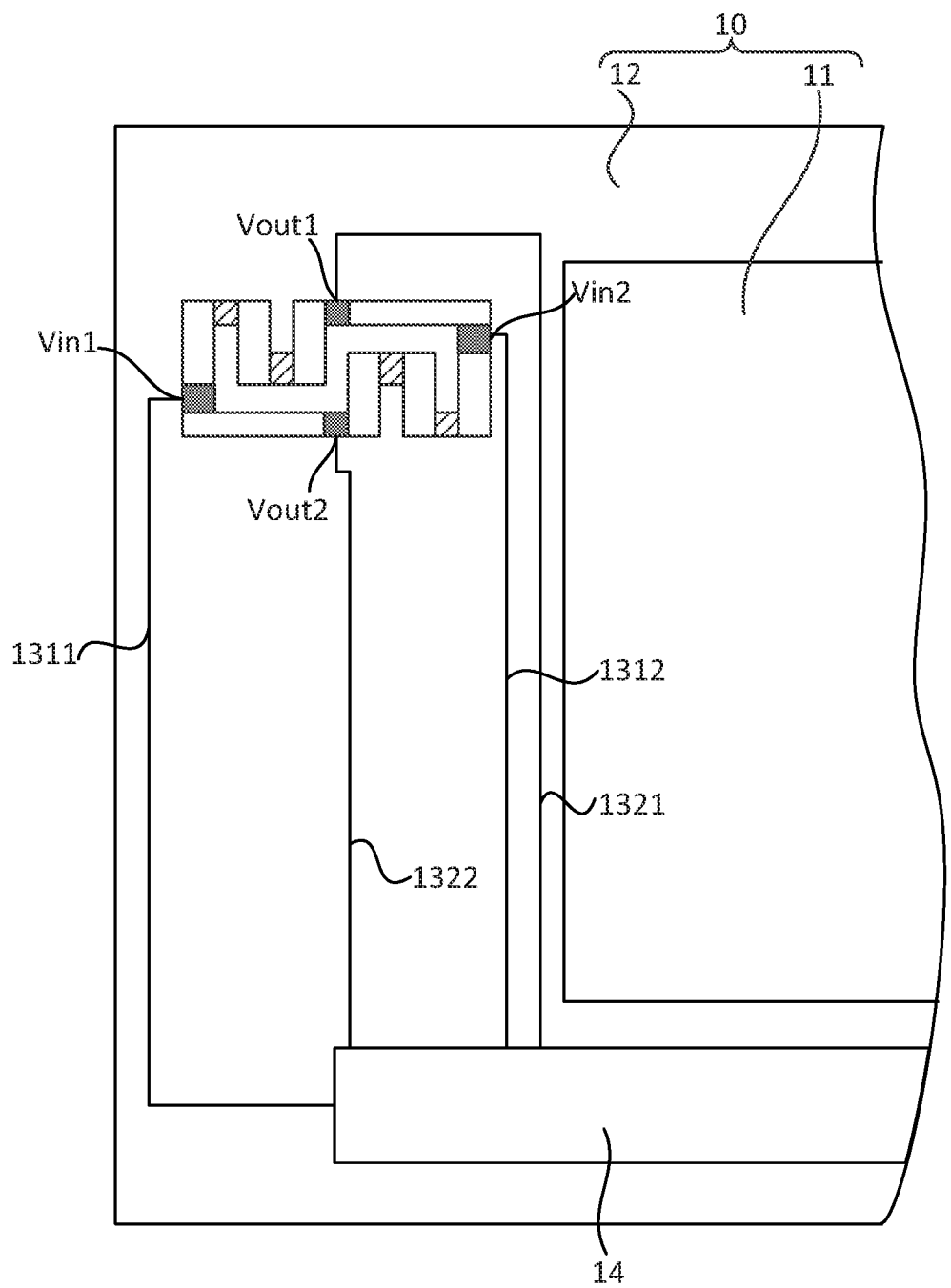
FIG. 10 is a structural representation of yet another display panel according to an embodiment of the disclosure.

FIG. 10 is a structural representation of yet another display panel according to an embodiment of the disclosure. Referring to FIG. 10, in addition to the pressure sensor 13, the display panel further includes a signal line and a drive chip 14. The signal line includes a first signal input line 1311, a second signal input line 1312, a first signal output line 1321 and a second signal output line 1322. The first power signal input terminal Vin1 is electrically connected with the drive chip 14 via the first signal input line 1311, the second power signal input terminal Vin2 is electrically connected with the drive chip 14 via the second signal input line 1312, the first induction signal measurement terminal Vout1 is electrically connected with the drive chip 14 via the first signal output line 1321, and the second induction signal measurement terminal Vout2 is electrically connected with the drive chip 14 via the second signal output line 1322.

During the operation of the pressure sensor 13, if the resistance value of the pressure sensor 13 is too small, it is possible that the resistance value thereof is comparable to the first signal input line 1311 and the second signal input line 1312. Because the first signal input line 1311 and the second signal input line 1312 may take away a part of the voltage, the magnitude of the voltage actually input onto the pressure sensor 13 may be very small. When the magnitude of the voltage input onto the pressure sensor 13 is too small, the pressure-sensitive induction detection signal input by the pressure sensor 13 may be very small too, so that the pressure-sensitive induction detection signal may be covered by the noise signals, which may lower the pressure detection sensitivity of the pressure sensor 13. Therefore, during practical manufacturing, it is often desired that the pressure sensor 13 has a large resistance value to ensure good pressure detection sensitivity thereof.

Figure 9:
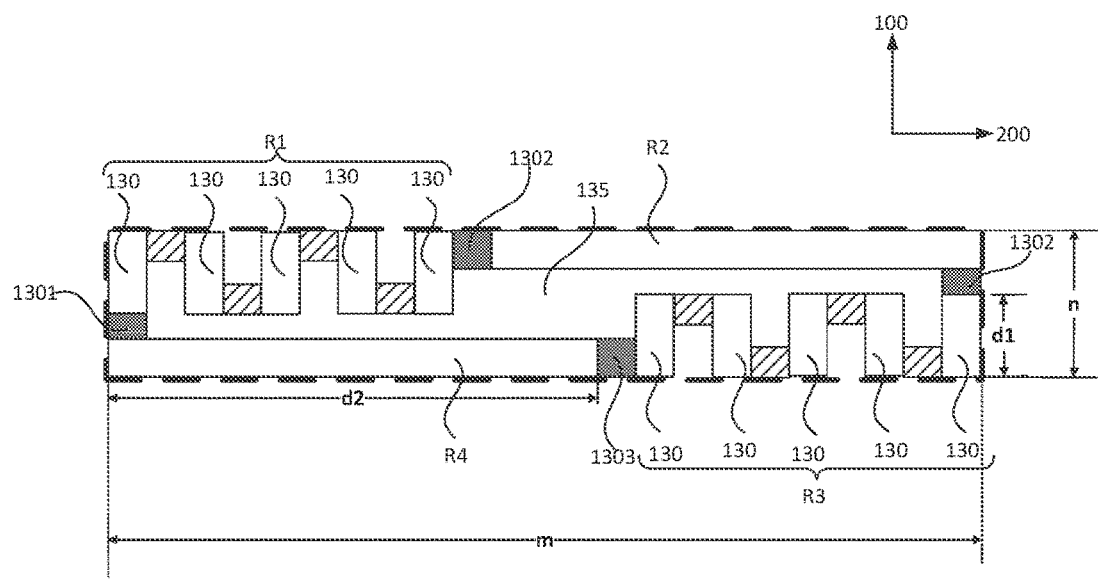
FIG. 9 is a structural representation of a pressure sensor according to an embodiment of the disclosure.

Still referring to FIG. 9 and FIG. 10, in order to make the pressure sensor 13 have a large resistance value, the number of subresistors 130 included in the first resistor R1 and the number of subresistors 130 included in the third resistor R3 may be increased, the length d1 of each subresistor 130 along the first direction 100 may be shortened, and also, the length d2 of the second resistor R2 and the fourth resistor R4 along the second direction 200 may be extended. The advantage of such a configuration lies in that, the ratio of the length m of the profile shape of the pressure sensor in the second direction 200 to the length n thereof in the first direction 100 may be increased, so that the profile shape of the pressure sensor may be arranged in a more "flat" manner. In comparison with the pressure sensor in the prior art, the pressure sensor provided in the disclosure is more applicable to be configured on a display panel.

For example, illustration may be given below on a high-definition 5-inch rectangular display panel. The direction of a long side of its display region 11 is taken as the extension direction, and the extension direction of the display region 11 is taken as the first direction 100, 500-1000 shift registers VSR often need to be arranged respectively on both sides of the extension direction of the display region 11 of the high-definition 5-inch rectangular display panel. With the development trend of narrow edge of the display panels, the size of the non-display region 12 of the display panel itself becomes small, and also a large number of shift registers VSR need to be arranged, so that the region of the non-display region 12 available for arranging the pressure sensor 13 is narrow and small. In practical arrangement, the locations of a part of the shift registers VSR in the existing display panels often need to be tuned in order to obtain a region in the non-display region 12 available for providing the pressure sensor 13. However, in such a display panel, even if the locations of the shift registers VSR are tuned, only a region having a total length of about 100 um available for providing the pressure sensor can be obtained in the first direction 100.

It may be understood by one skilled in the art that, in order to ensure that the display panel has a good touch pressure detection effect, a plurality of pressure sensors need to be provided successively along the extension direction of the display region 11 (i.e., the first direction 100). Under the condition that the total length f of the region available for arranging the pressure sensor along the first direction 100 is given, the smaller the length n of the pressure sensor in the first direction is, the larger the number of the pressure sensors which can be provided on the display panel may be, and the more benefit it may be to improve the pressure-sensitive detection performance of the display panel.

Figure 11:
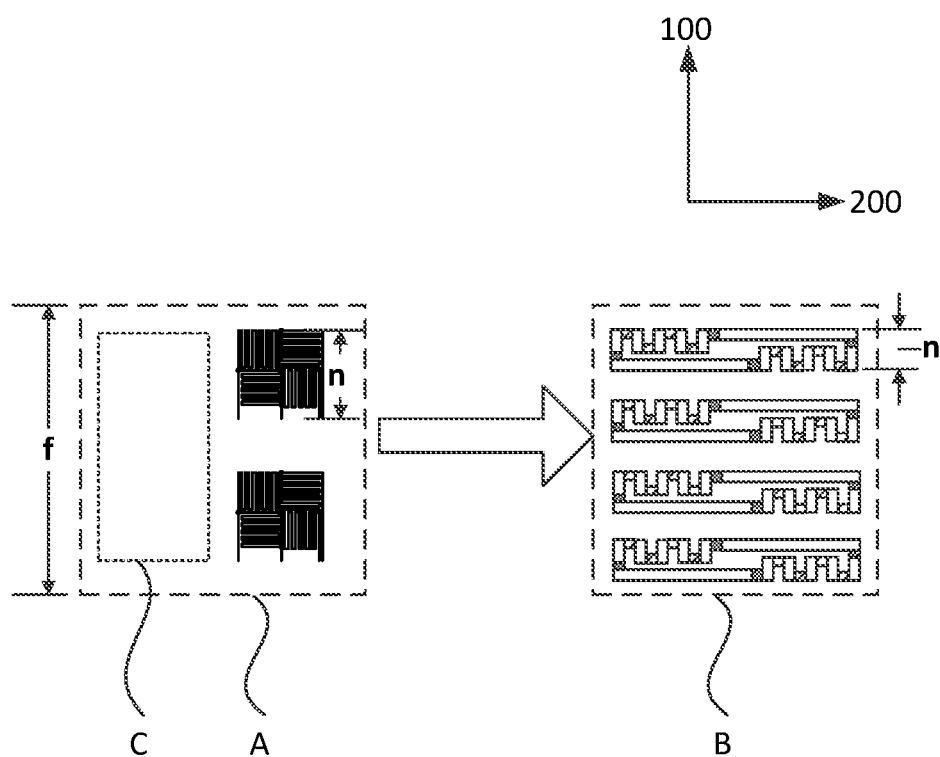
FIG. 11 is a schematic diagram showing the actual arrangements of a pressure sensor according to an embodiment of the disclosure and an existing pressure sensor in a display panel.

FIG. 11 is a schematic diagram showing the actual arrangements of a pressure sensor according to an embodiment of the disclosure and an existing pressure sensor in a display panel. In FIG. 11, the dashed block A and the dashed block B are both pressure sensor arrangement regions. Referring to FIG. 11, the profile pattern of the existing pressure sensor is a square, and in order to guarantee a large resistance value thereof, the side length of the profile pattern of the pressure sensor (including the length n along the first direction 100) needs to be made very large, which may limits the number of the arranged pressure sensors. Moreover, such a pressure sensor cannot make full use of all the regions in the dashed block A, for example, the region C in the dashed block A is not used by the pressure sensor yet.

Referring to FIG. 9, in the pressure sensor according to the disclosure, the number of subresistors 130 included in the first resistor R1 and the number of subresistors 130 included in the third resistor R3 may be increased, the length d1 of each subresistor 130 along the first direction 100 may be shortened, and also, the length d2 of the second resistor R2 and the fourth resistor R4 along the second direction 200 may be extended, so that the profile shape of the pressure sensor may be a rectangle. With such a configuration, the pressure sensor may be fully extended in the second direction 200 to make full use of the region C that cannot be used in the existing pressure sensor. Moreover, the length n of the pressure sensor in the first direction 100 is shortened, so that more pressure sensors can be arranged in the first direction 100, thereby improving the pressure-sensitive detection performance of the display panel.

Figure 12:
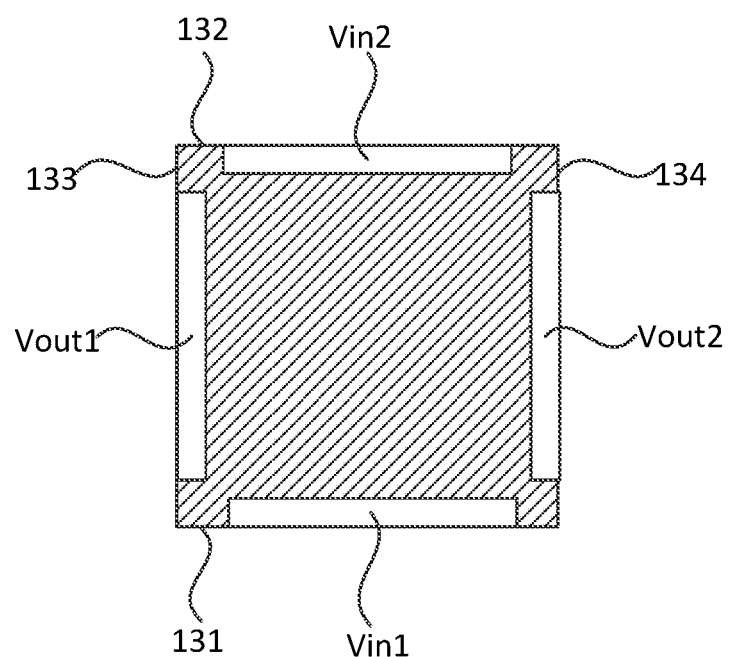
FIG. 12 is a structural representation of another pressure sensor in the prior art.

Exemplarily, FIG. 12 is a structural representation of another pressure sensor in the prior art. Referring to FIG. 12, the pressure sensor is a quadrangle, and it is made of a semiconductor material and includes a first side 131 and a second side 132 provided opposite to each other, and a third side 133 and a fourth side 134 provided opposite to each other; the pressure sensor includes a first power signal input terminal Vin1 located on the first side 131 and a second power signal input terminal Vin2 located on the second side 132 to input a bias voltage signal to the pressure sensor 13; the pressure sensor further includes a first induction signal measuring terminal Vout1 located on the third side 133 and a second induction signal measuring terminal Vout2 located on the fourth side 134 to output a pressure-sensitive detection signal from the pressure sensor 13.

Similarly, in order to make the pressure sensor provided in FIG. 12 have a large resistance value, the size of the quadrangle pressure sensor also needs to be provided very large. This may limit the number of pressure sensors that can be provided on the display panel. Apparently, given a region with the same size, the number of the provided pressure sensors may be increased by employing the pressure sensor according to the disclosure if compared with the pressure sensor provided in FIG. 12.

Further, according to formula $$R = \rho \frac{l}{S},$$

wherein, R is the resistance value of the resistor, ρ is the resistivity of the material forming the resistor, l is the length of the resistor along the current flow direction, and S is the cross section of the resistor vertical to the current flow direction. Because the pressure sensor according to the disclosure includes the subresistor 130, the second resistor R2 and the fourth resistor R4, the ratio of the length l of each subresistor 130, the second resistor R2 and the fourth resistor R4 along the current flow direction to the cross section S of the resistor vertical to the current flow direction may be adjusted flexibly, so that the resistance value of the pressure sensor according to the disclosure may be further increased, the area of the profile pattern of the pressure sensor may be shortened, the number of pressure sensors that may be arranged on the display panel may be increased, and hence the pressure detection performance of the display panel may be improved.

In the above technical solutions, the material of the first resistor R1, the second resistor R2, the third resistor R3 and the fourth resistor R4 is an amorphous silicon material or a polysilicon material.

Figure 13:
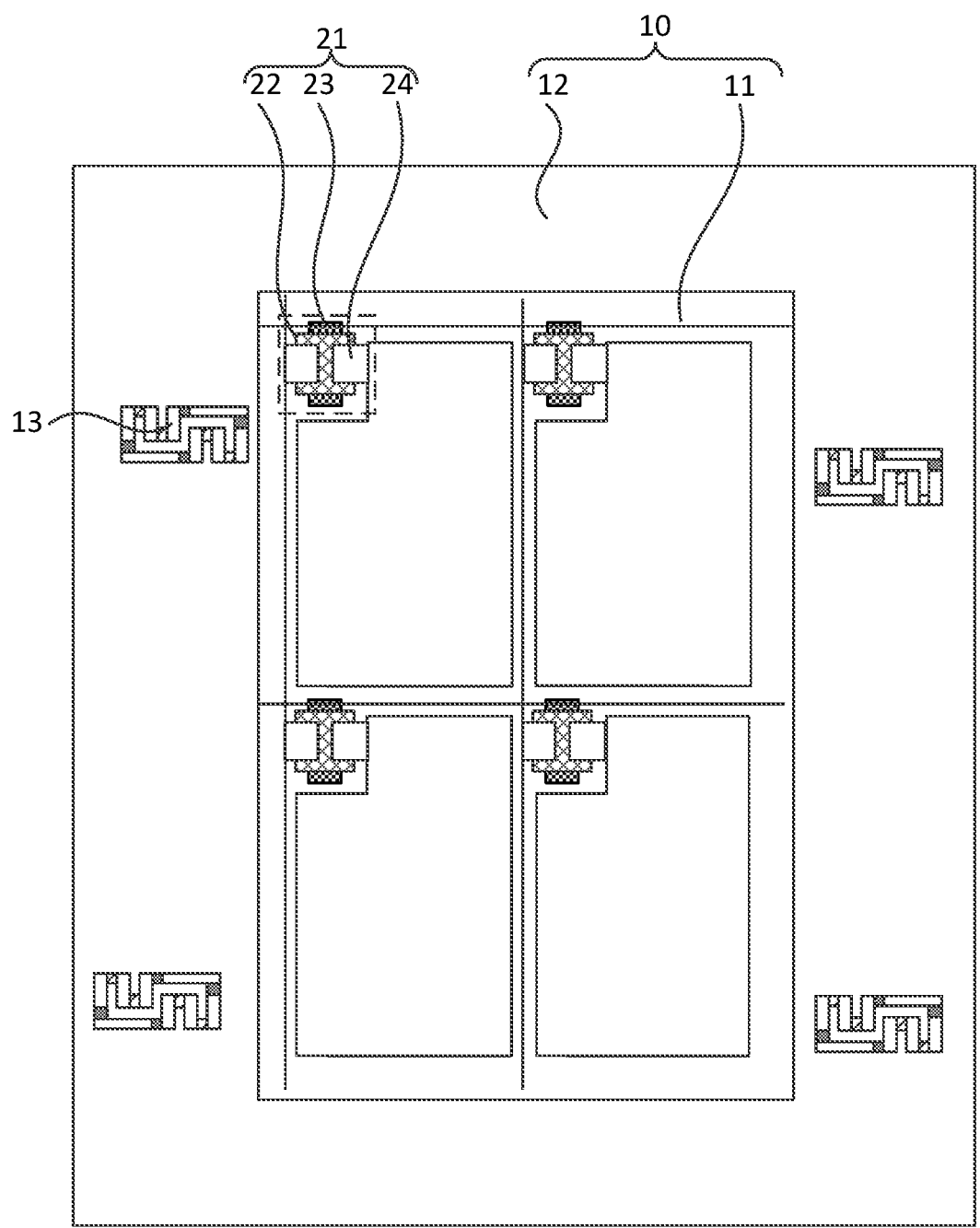
FIG. 13 is a structural representation of yet another display panel according to an embodiment of the disclosure.

FIG. 13 is a structural representation of yet another display panel according to an embodiment of the disclosure. Referring to FIG. 13, the display panel includes at least one thin-film transistor 21, and the thin-film transistor 21 includes an active layer 22; the first resistor R1, the second resistor R2, the third resistor R3 and the fourth resistor R4 of the pressure sensor 13 may be provided on the same layer as the active layer 22. The advantage of such a configuration lies in that, the first resistor R1, the second resistor R2, the third resistor R3 and the fourth resistor R4 of the pressure sensor 13 may be formed in the same manufacture process as the active layer 22, so that the manufacture processes may be saved, the manufacture technique may be simplified, and the production cost may be lowered.

Still referring to FIG. 13, the thin-film transistor 22 in the array substrate further includes a gate layer 23 or a source-drain layer 24. In one embodiment, the first set of connection blocks (including the first connection block 1301, the second connection block 1302, the third connection block 1303 and the fourth connection block 1304) and the second set of connection blocks 136 may be provided on the same layer as the gate layer 23 or the source-drain layer 24. The advantage of such a configuration lies in that, the first set of connection blocks and the second set of connection blocks 136 may be formed in the same manufacture process as the gate layer 23 or the source-drain layer 24, so that the manufacture processes may be saved, the manufacture technique may be simplified, and the production cost may be lowered.

It needs to be noted that, in FIG. 13, the thin-film transistor 21 is provided in the display region 11, and it is mainly configured to control the working state of each pixel unit. This is merely a specific example of the disclosure, rather than limiting the disclosure. In one embodiment, because the array substrate further includes a thin-film transistor integrated in the shift register VSR inside the non-display region 12, the thin-film transistor may be configured to generate a scanning signal. In one embodiment, the pressure sensor 13 may also be provided on the same layer as the active layer of the thin-film transistor integrated in the shift register VSR inside the non-display region 12, so that the manufacture processes may be saved, the manufacture technique may be simplified, and the production cost may be lowered. Also, the first set of connection blocks (including the first connection block 1301, the second connection block 1302, the third connection block 1303 and the fourth connection block 1304) and the second set of connection blocks 136 may be provided on the same layer as the gate layer or the source-drain layer of the thin-film transistor integrated in the shift register VSR inside the non-display region 12.

In one embodiment, the display panel may also include a control switch electrically connected with the pressure sensor, which is configured to control the working state of each pressure sensor. By providing a control switch electrically connected with the pressure sensor on the display panel, each pressure sensor on the display panel can be made to work independently, which is favorable for flexibly adjusting the working state of each pressure sensor according to factors such as the touch location and the intensity of the pressure-sensitive induction detection signal, etc., so as to lower the power consumption of the display panel. Specifically, the control switch 25 may have various specific structures, and detailed illustration may be given below on a typical example, without limiting the disclosure.

Figure 14:
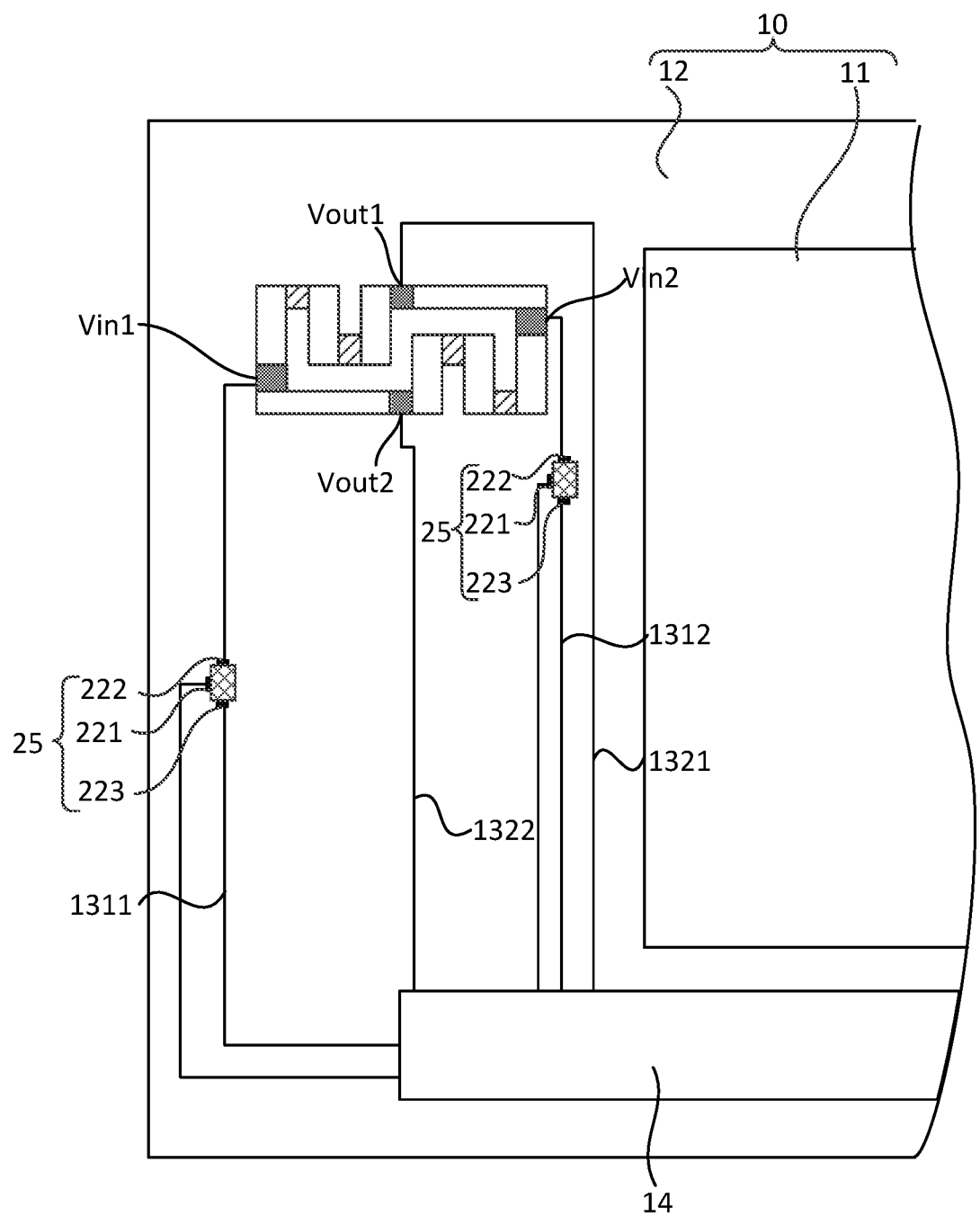
FIG. 14 is a partial structural representation of yet another display panel according to an embodiment of the disclosure.

FIG. 14 is a partial structural representation of yet another display panel according to an embodiment of the disclosure. Referring to FIG. 14, the control switch 25 includes a control end 221, a first electrode 222 and a second electrode 223; the control end 221 is electrically connected with the drive chip 14 to control the on or off of the control switch 25; the first electrode 222 is electrically connected with the first power signal input terminal Vin1 of the pressure sensor 13, and the second electrode 223 is electrically connected with the first signal input line 1311; or, the first electrode 222 is electrically connected with the second power signal input terminal Vin2 of the pressure sensor 13, and the second electrode 223 is electrically connected with the second signal input line 1312. The advantage of such an arrangement lies in that, it is favorable for intentionally controlling the working state of each pressure sensor 13 according to factors such as the touch location and the intensity of the pressure-sensitive induction detection signal, etc., so that in the touch pressure detection stage, only a part of the pressure sensors 13 on the display panel are in a on state, thereby lowering the power consumption and reducing the heat dissipation.

Figure 15:
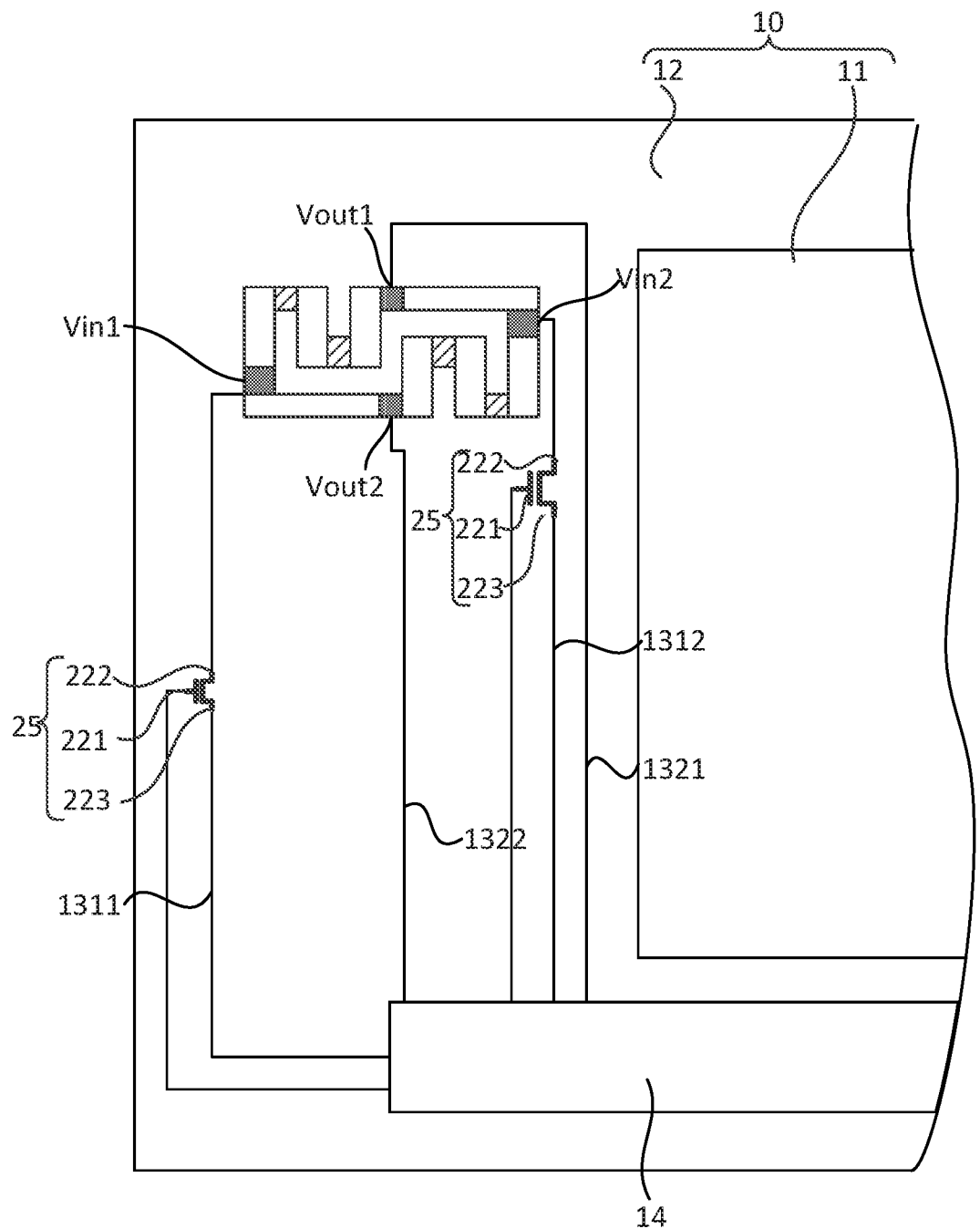
FIG. 15 is a partial structural representation of yet another display panel according to an embodiment of the disclosure.

FIG. 15 is a partial structural representation of yet another display panel according to an embodiment of the disclosure. Further, referring to FIG. 15, the control switch 25 may include a thin-film transistor, which includes a source electrode, a drain electrode and a gate electrode; the source electrode is the second electrode 223 of the control switch 25, the drain electrode is the first electrode 222 of the control switch 25, and the gate electrode is the control end 221 of the control switch 25. The advantage of using a thin-film transistor as a control switch lies in that the structure is simple and the area of the non-display region 12 needed for manufacturing the thin-film transistor is small, which is consistent with the development trend of narrow frame. Additionally, the display panel generally includes a plurality of thin-film transistors configured to control the working state of each pixel unit and a plurality of thin-film transistors integrated in the shift register and configured to generate a scanning signal. In one embodiment, the thin-film transistor functioning as a control switch is manufactured together with the thin-film transistors configured to control the working state of each pixel unit or the thin-film transistors configured to generate a scanning signal, so that the manufacture processes may be saved, the manufacture technique may be simplified, and the production cost may be lowered.

Figure 16:
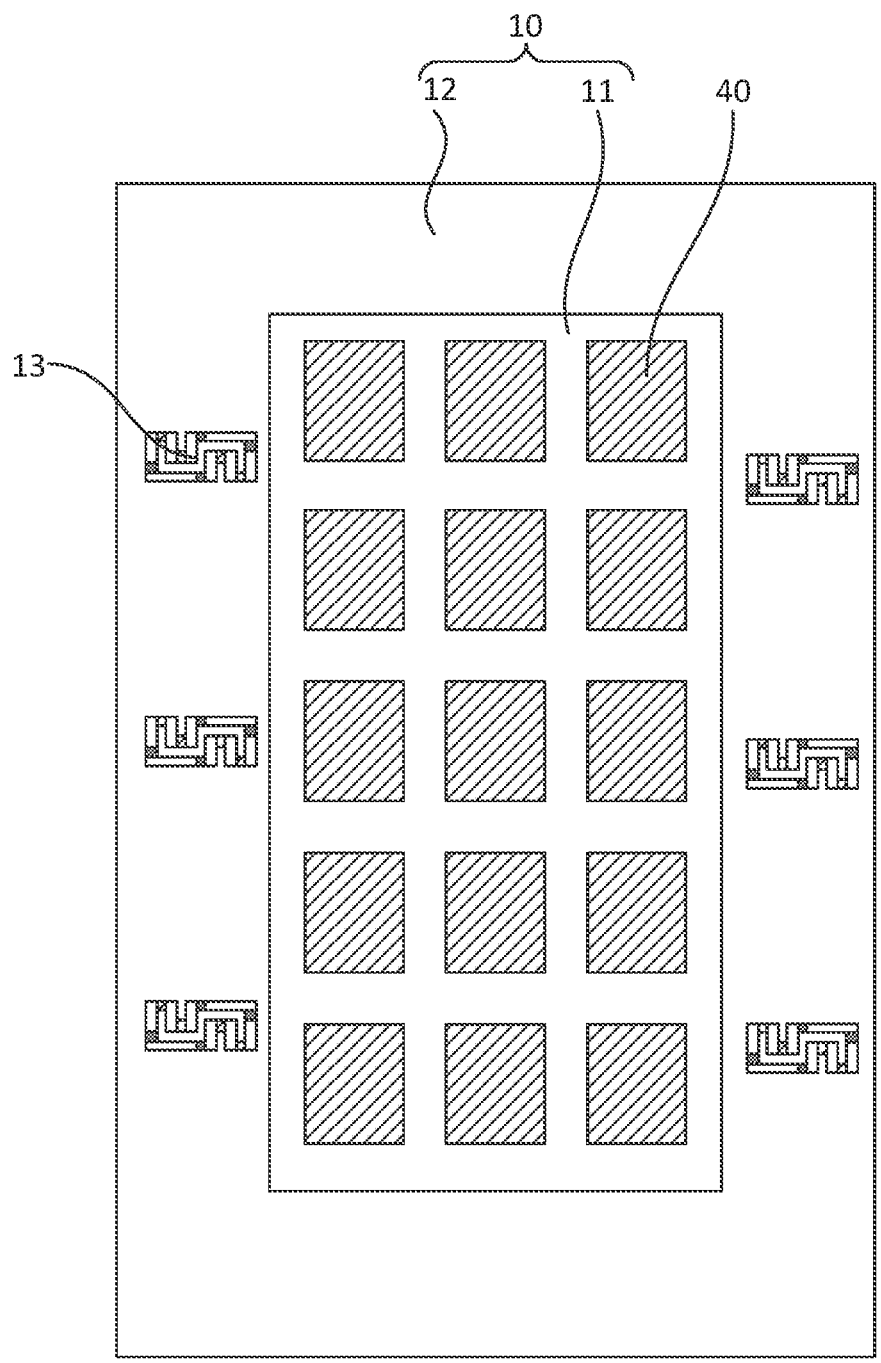
FIG. 16 is a partial structural representation of yet another display panel according to an embodiment of the disclosure.

FIG. 16 is a partial structural representation of yet another display panel according to an embodiment of the disclosure. Further, referring to FIG. 16, the display panel further includes a touch electrode 40. The touch electrode 40 is a self-capacitance touch electrode or a mutual-capacitance touch electrode for touch location detection.

Detailed illustration may be given below on the working principle of the self-capacitance touch electrode taking a self-capacitance touch electrode as an example, without limiting the disclosure. Exemplarily, if the touch electrode 40 is a self-capacitance touch electrode, as shown in FIG. 16, a plurality of self-capacitance touch electrodes 40) are optionally provided on the touch panel, and the touch electrodes 40 are bulk electrodes, and each touch electrode 40 corresponds to one determined coordinate location. Moreover, these touch electrodes 40 respectively form a capacitor with the ground. When a finger touches the display panel, the capacitance of the finger may be added to the touch electrode 40 touched by the finger, so that the ground capacitance of the touch electrode 40 touched by the finger may change. The change of signals of each touch electrode 40 reflects the change of the ground capacitance of the touch electrode 40, so that by detecting the signal change of each touch electrode 40, it may determine the specific touch electrode 40 of which the signal changes, thereby determining the touch location of the finger according to the coordinate values corresponding to the touch electrode 40 of which the signal changes.

In the pressure detection stage, according to the touch location, only a part of the pressure sensors 13 close to the touch location may be turned on, and the pressure sensors 13 far from the touch location may be turned off, so that the power consumption of the display panel during touch pressure detection may be lowered, and the heat generated by the display panel during touch pressure detection may be lowered, and hence it may be avoided that the performance of other functional layers (for example, a functional layer for image display) on the display panel is affected or even the display panel cannot work normally due to the too high temperature in a regional area of the display panel.

Figure 17:
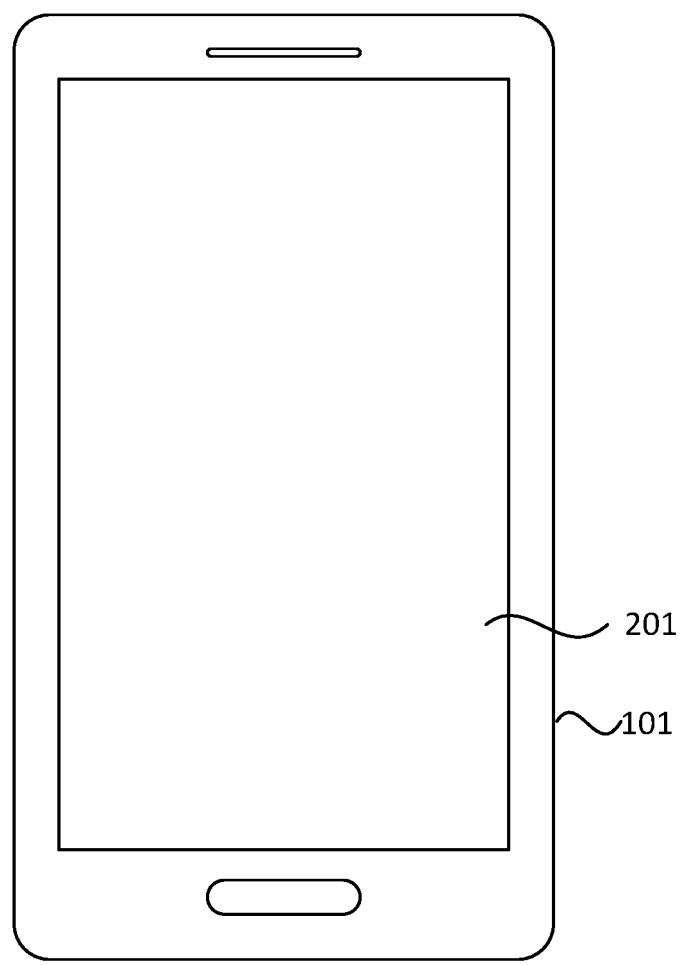
FIG. 17 is a structural representation of a touch display device according to an embodiment of the disclosure.

An embodiment of the disclosure further provides a touch display device. FIG. 17 is a structural representation of a touch display device according to an embodiment of the disclosure. Referring to FIG. 17, the touch display device 101 includes any display panel 201 according to the embodiments of the disclosure, and the touch display device 101 may be a mobile phone, a tablet computer and an intelligent wearable device, etc.

In the embodiments of the disclosure, a first set of connection blocks and a second set of connection blocks of a metal material are added, and the subresistors forming the same resistor is connected end to end with each other via the second set of connection blocks, each subresistor extends along the first direction, and the second resistor and the fourth resistor extend along the second direction, so that the first resistor and the third resistor formed by the subresistors can only sense the strain in the first direction, and the strains in other directions except for the first direction cannot be sensed; also, the second resistor and the fourth resistor can only sense the strain in the second direction, and the strains in other directions except for the second direction cannot be sensed, and the signals on the resistors forming the pressure sensor may not be cancelled due to the simultaneous sensing of the strains in two or more directions, so that the pressure-sensitive detection signal output by the pressure sensor may be enlarged, and hence the problem of the existing display panel may be solved that, because any electrode consisting the pressure sensor may be affected by the strain in the first direction 100 and the strain in the second direction 200 simultaneously, signal cancellation may occur so that the pressure-sensitive detection signal output from the pressure sensor finally may be very small, and the pressure-sensitive detection performance is poor, thereby improving the pressure-sensitive detection performance of the display panel.

It should be noted that the embodiments of the present disclosure and the technical principles used therein are described as above. It should be appreciated that the disclosure is not limited to the particular embodiments described herein, and any apparent alterations, modification and substitutions can be made without departing from the scope of protection of the disclosure. Accordingly, while the disclosure is described in detail through the above embodiments, the disclosure is not limited to the above embodiments and can further include other additional embodiments without departing from the concept of the disclosure.

What is claimed is:

1. A display panel, comprising:
   a substrate;
   at least one pressure sensor provided on the substrate, wherein the pressure sensor comprises a first resistor, a second resistor, a third resistor, a fourth resistor, a first set of connection blocks and a second set of connection blocks; wherein
   the first resistor, the second resistor, the third resistor and the fourth resistor are made of semiconductor material, and the first set of connection blocks and the second set of connection blocks are made of metal material;
   the display panel further comprises a first direction and a second direction intersecting the first direction; each of the first resistor and the third resistor comprises at least two subresistors; and each of the subresistors forming the same resistor is connected end to end with each other via the second set of connection blocks;
   each of the subresistors, the second resistor and the fourth resistor has a bar shape, each of the subresistors extends along the first direction, and the second resistor and the fourth resistor extend along the second direction;
   the first set of connection blocks comprises a first connection block, a second connection block, a third connection block and a fourth connection block; a first end of the first resistor and a first end of the fourth resistor are electrically connected with the first connection block, a second end of the first resistor and a first end of the second resistor are electrically connected with the second connection block, and a second end of the fourth resistor and a first end of the third resistor are electrically connected with the third connection block, and a second end of the second resistor and a second end of the third resistor are electrically connected with the fourth connection block; and
   a first power signal input terminal is provided on the first connection block, a second power signal input terminal is provided on the fourth connection block, and the first power signal input terminal and the second power signal input terminal are configured to input a bias voltage signal to the pressure sensor; also, a first sensing signal output terminal is provided on the second connection block, and a second sensing signal output terminal is provided on the third connection block, and the first sensing signal output terminal and the second sensing signal output terminal are configured to output a pressure-sensitive detection signal from the pressure sensor;

wherein the display panel comprises a display region and a non-display region surrounding the display region, and the pressure sensor is located in the non-display region;

wherein the non-display region of the display panel further comprises a plurality of cascaded shift registers;

the pressure sensor is located between adjacent two of the shift registers; and a profile of the pressure sensor has a rectangle shape.

2. The display panel as claimed in claim 1, wherein the first direction and the second direction are vertical to each other.

3. The display panel as claimed in claim 1, wherein a ratio of a resistance value of the first resistor to a resistance value of the second resistor is equal to a ratio of a resistance value of the fourth resistor to a resistance value of the third resistor.

4. The display panel as claimed in claim 3, wherein the resistance values of the first resistor, the second resistor, the third resistor and the fourth resistor are equal to each other.

5. The display panel as claimed in claim 1, wherein each of the subresistors of the first resistor, the subresistors of the third resistor, the second resistor and the fourth resistor has a rectangle shape; and a cross-sectional area of each of the subresistors vertical to the first direction, a cross-sectional area of the second resistor vertical to the second direction and a cross-sectional area of the fourth resistor vertical to the second direction are equal to each other.

6. The display panel as claimed in claim 1, wherein the first resistor, the second resistor, the third resistor and the fourth resistor are made of amorphous silicon material or polysilicon material.

7. The display panel as claimed in claim 6, wherein the display panel comprises at least one thin-film transistor, and the thin-film transistor comprises an active layer;

the first resistor, the second resistor, the third resistor and the fourth resistor of the pressure sensor are provided on the same layer as the active layer.

8. The display panel as claimed in claim 7, wherein the thin-film transistor further comprises a gate layer and a source-drain layer, wherein the first set of connection blocks and the second set of connection blocks are provided on the same layer as the gate layer or the source-drain layer.

9. The display panel as claimed in claim 1, wherein the display panel further comprises a control switch electrically connected with the pressure sensor to control a working state of each of the pressure sensors.

10. The display panel as claimed in claim 1, wherein the display panel further comprises a touch electrode, wherein the touch electrode is a self-capacitance touch electrode or a mutual-capacitance touch electrode for touch location detection.

11. The display panel as claimed in claim 1, wherein the display panel is a liquid crystal display panel or an OLED display panel.

12. A touch display device, comprising a display panel, which comprises:

a substrate;

at least one pressure sensor provided on the substrate, wherein the pressure sensor comprises a first resistor, a second resistor, a third resistor, a fourth resistor, a first set of connection blocks and a second set of connection blocks; wherein the first resistor, the second resistor, the third resistor and the fourth resistor are made of semiconductor material, and the first set of connection blocks and the second set of connection blocks are made of metal material;

the display panel further comprises a first direction and a second direction intersecting the first direction; each of the first resistor and the third resistor comprises at least two subresistors; and each of the subresistors forming the same resistor is connected end to end with each other via the second set of connection blocks;

each of the subresistors, the second resistor and the fourth resistor has a bar shape, each of the subresistors extends along the first direction, and the second resistor and the fourth resistor extend along the second direction;

the first set of connection blocks comprises a first connection block, a second connection block, a third connection block and a fourth connection block; a first end of the first resistor and a first end of the fourth resistor are electrically connected with the first connection block, a second end of the first resistor and a first end of the second resistor are electrically connected with the second connection block, and a second end of the fourth resistor and a first end of the third resistor are electrically connected with the third connection block, and a second end of the second resistor and a second end of the third resistor are electrically connected with the fourth connection block; and a first power signal input terminal is provided on the first connection block, a second power signal input terminal is provided on the fourth connection block, and the first power signal input terminal and the second power signal input terminal are configured to input a bias voltage signal to the pressure sensor; also, a first sensing signal output terminal is provided on the second connection block, and a second sensing signal output terminal is provided on the third connection block, and the first sensing signal output terminal and the second sensing signal output terminal are configured to output a pressure-sensitive detection signal from the pressure sensor;

wherein the display panel comprises a display region and a non-display region surrounding the display region, and the pressure sensor is located in the non-display region;

wherein the non-display region of the display panel further comprises a plurality of cascaded shift registers;

the pressure sensor is located between adjacent two of the shift registers; and a profile of the pressure sensor has a rectangle shape.

* * * * *